| United States Patent [19] | [11] Patent Number: 4,972,445 |
|---|---|
| Terada et al. | [45] Date of Patent: Nov. 20, 1990 |

[54] DATA TRANSMISSION APPARATUS

[75] Inventors: Hiroaki Terada, Suita; Katsuhiko Asada, Amagasaki; Hiroaki Nishikawa, Suita; Kenji Shima, Nishinomiya; Shinji Komori, Itami; Souichi Miyata; Satoshi Matsumoto, both of Nara; Hajime Asano, Toyonaka; Masahisa Shimizu, Kadoma; Hiroki Miura, Hirakata, all of Japan

[73] Assignees: Mitsubishi Denki Kabushiki Kaisha, Tokyo; Sharp Kabushiki Kaisha, Osaka; Matsushita Electric Industrial Co., Ltd., Osaka; Sanyo Electric Co., Ltd., Osaka, all of Japan

[21] Appl. No.: 432,355

[22] Filed: Nov. 6, 1989

Related U.S. Application Data

[63] Continuation of Ser. No. 245,773, Sep. 19, 1988, abandoned, which is a continuation of Ser. No. 883,706, Jul. 9, 1986, abandoned.

[30] Foreign Application Priority Data

| Jul. 9, 1985 | [JP] | Japan | 60-151981 |
| Jul. 9, 1985 | [JP] | Japan | 60-151982 |
| Jul. 9, 1985 | [JP] | Japan | 60-151983 |
| Jul. 9, 1985 | [JP] | Japan | 60-151984 |
| Jul. 9, 1985 | [JP] | Japan | 60-151985 |

[51] Int. Cl.$^5$ .................................................. H03J 3/06
[52] U.S. Cl. .................................... 375/121; 375/118; 370/91; 370/108
[58] Field of Search ..................... 375/121, 118, 117; 370/108, 91, 105.3, 49, 55, 41, 48; 369/60

[56] References Cited

U.S. PATENT DOCUMENTS

| 2,986,602 | 5/1961 | Tubinis | 370/55 |
| 4,525,849 | 6/1985 | Wolf | 375/118 |

Primary Examiner—Douglas W. Olms
Assistant Examiner—Ralph Smith
Attorney, Agent, or Firm—Birch, Stewart, Kolasch & Birch

[57] ABSTRACT

A data transmission apparatus for transmitting data between systems includes: an input data transmission path, an output data transmission path, and a branch data transmission path each constituted by a shift register, each data transmission path has a plurality of data storage circuits and a plurality of transfer control circuits each provided corresponding to each o--stage. The data storage circuit control a self stage data storage circuit in accordance with a control signal from the transfer control circuit of an adjacent stage. An initialization circuit for initializing the device is provided so that data on the data transmission path does not remain at the start of operation of the device.

9 Claims, 13 Drawing Sheets

FIG. 8.
(a)
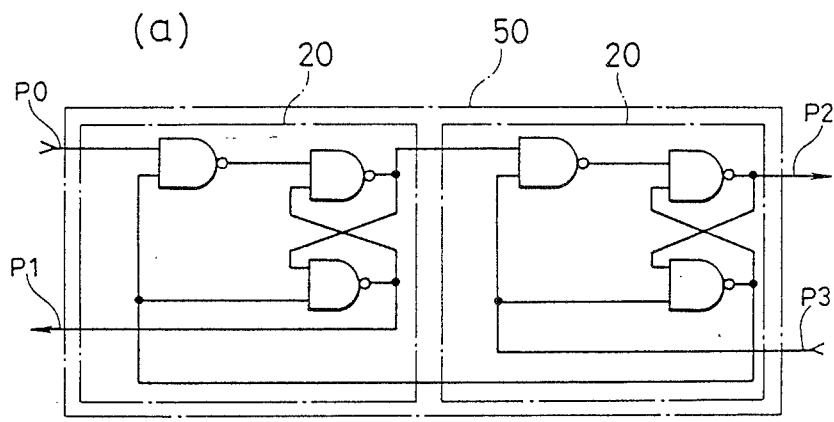
(b)
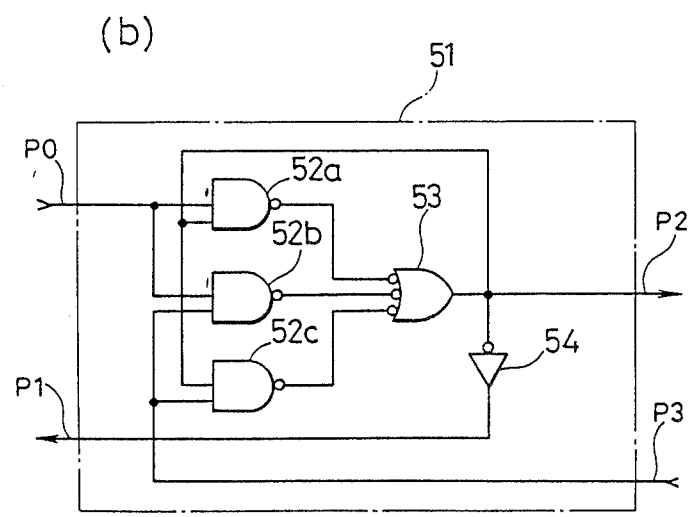

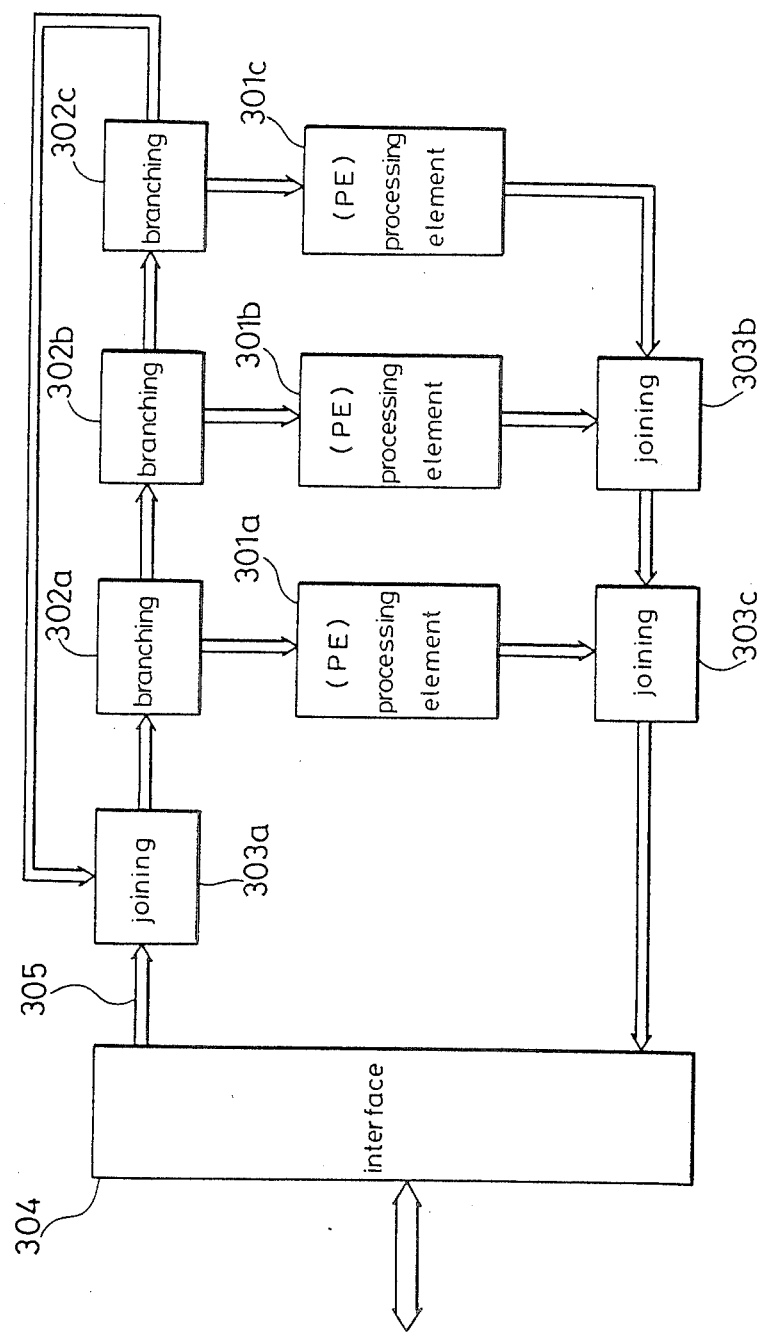
F I G .15.

DATA TRANSMISSION APPARATUS

This application is a continuation of application Ser. No. 07/245,773 filed on Sept. 19, 1988, now abandoned, which is a continuation of application Ser. No. 06/883,706 filed on July 29, 1986, now abandoned.

FIELD OF THE INVENTION

The present invention relates to a data transmission apparatus for transmitting data between non-synchronously operating systems.

BACKGROUND OF THE INVENTION

Conventionally, when data transmission is conducted between non-synchronous systems, large capacity FIFO (first-in first-out) memories are used as buffers between systems (refer to "Interface", August 1984, pp 268 to 270). For example, as shown in FIG. 1 in a case where data transmission is conducted between non-synchronously operating systems A and B, a structure is adopted in which a FIFO memory 3 is connected between the output of the system A1 and the input of the system B2, the output of the system A1 thereby being buffered. When data transmission is conducted between a plurality of non-synchronous systems, FIFO memories 8 to 10 are connected between the non-synchronous systems 4 to 7 as shown in FIG. 2.

When such FIFO memories are used for data transmission between non-synchronous systems in such a conventional data transmission apparatus, it is only possible to connect a plurality of non-synchronous systems only because FIFO memories only function to buffering data. The whole system connected by FIFO memories constitutes a pipe line processing apparatus including a simple cascade connection, which has a low degree of freedom.

The inventors have already proposed a data transmission apparatus capable of obtaining a high degree of freedom in constituting a whole system by connecting non-synchronous systems (Japanese patent applications No. Sho. 60-33035 and 60-33036). This data transmission apparatus is constituted such that an input data transmission path, an output data transmission path, a branch data transmission path, and a joining data transmission path are constructed by a non-synchronous self running shift register, whether the data on the input data transmission path is to be branched or not is judged by a branching judging means, data is given to the branch data transmission path from the input data transmission path when the data is to be branched and is given to the output data transmission path otherwise, and the data on the joining data transmission path is given to the output data transmission path when empty buffers exist in the input and output data transmission paths, whereby non-synchronous systems are capable of being connected in parallel as well as serially.

FIG. 15 shows a system of such a data transmission apparatus. In FIG. 15 the 305 designates a data transmission path, 302a to 302c designate a branching section, 303a to 303c designate a joining section, 301a to 301c designate a processing element, and 304 designates an interface.

In this system, the packet data transmitted into device through the interface 304 from an external source reaches one of the processing elements 301a to 301c circulating the network elements 303a and 302a to 302c, and is processed by the respective processing elements 301a to 301c, the processed results are collected by the network elements 303b and 303c, and sent out through the interface 304.

In the above-described data transmission apparatus, however, the branching judging means is operated by the changing from 0 to 1 of the data. In more detail, a particular bit thereof on the data transmission path is detected, thereby judging the branching condition of the data, and accordingly a case may arise where the branching judging means does not operate depending on the state of the data transmission path, particularly in such a case where the particular bit of the data directly before the start of operation triggered by the power ON is 1, and the data to be therefore cannot be branched.

Furthermore, in the above-described data transmission apparatus where a data transmission path is constituted by a self running shift register, the data is unfavourably likely to remain on the data transmission path when a device is started by the power ON function. This results in a reduced reliability.

In order to solve such a problem, the data transmission path can be initialized by resetting the self running shift registers of the data transmission path at the start of operation. This method, however, requires the resetting of all registers of the data transmission path, resulting in an increase in circuit size.

Furthermore, the above-mentioned data transmission apparatus can be applied to an arithmetic operation device, in which there may be cases where various states of function elements are to be observed. As a method of observing the observation from the flow of the data on the data transmission path can be conducted. In the above-described data transmission apparatus having the data transmission paths constituted by self running shift registers, however, the data is transmitted at a very high speed such as 25 nsec to 50 nsec, and it is impossible to observe the respective function element from the data flow.

Furthermore, when a data transmission path is constituted by a non-synchronous self running shift register, there is a request to use different kinds of C elements as transfer control circuits which give rising edge triggers to the parallel data buffers constituting the shift register. However, in this case a malfunction may occur when a control signal is input at a timing other than a predetermined one, and different kinds of C element cannot be connected as they are requested. Furthermore, a malfunction may arise in cases where C elements of the same kind but of different operation speeds are used.

SUMMARY OF THE INVENTION

An object of the present invention is to provide an improved data transmission apparatus capable of initializing the data transmission path with no increase in the circuit size.

A second object of the present invention is to provide an improved data transmission apparatus capable of assuredly branching the data which is to be branched at the start of operation of the device.

A third object of the present invention is to provide an improved data transmission apparatus capable of transmitting data part by part slowly if required.

A fourth object of the present invention is to provide an improved data transmission apparatus which does not malfunction even if C elements of different kinds and different speeds are used.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a data transmission apparatus for transmitting data between systems comprising: an input data transmission path, an output data transmission path, and a branch data transmission path each constituted by a shift register, each data transmission path comprising a plurality of data storage means and a plurality of transfer control circuits each provided corresponding to each stage, said data storage means for controlling the self stage data storage means in accordance with a control signal from said transfer control circuit of an adjacent stage; and an initialization means for initializing the device so that the data previously on the data transmission path does not remain at the start of operation of the device.

BRIEF DESCRIPTION OF THE DRAWINGS

FIGS. 8(a) and (b) are diagrams each showing another C element which can be used in the present invention;

FIG. 15 is a circuit diagram showing the whole construction of a previous data transmission apparatus proposed by the inventors;

DETAILED DESCRIPTION OF THE PREFERRED EMBODIMENTS

In order to explain the present invention in detail, reference will be particularly made to FIGS. 3 to 7.

Figure 1:
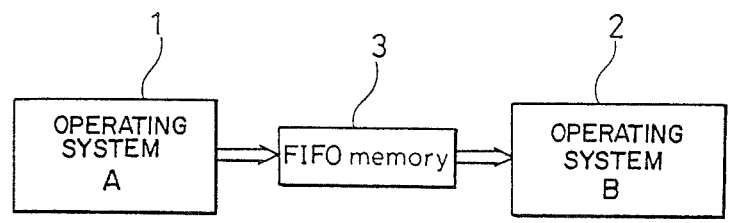
FIGS. 1 and 2 are diagrams each showing a conventional data transmission apparatus.
Figure 2:
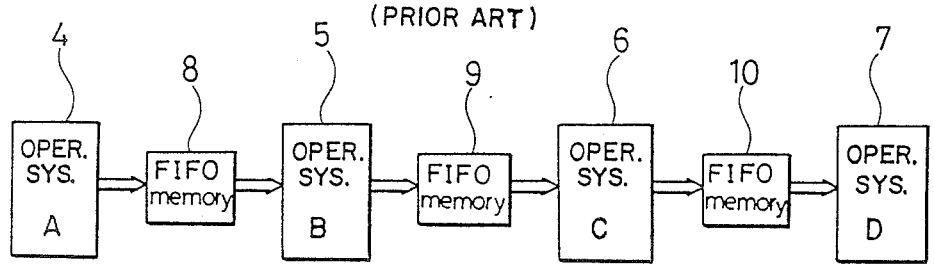
Figure 3:
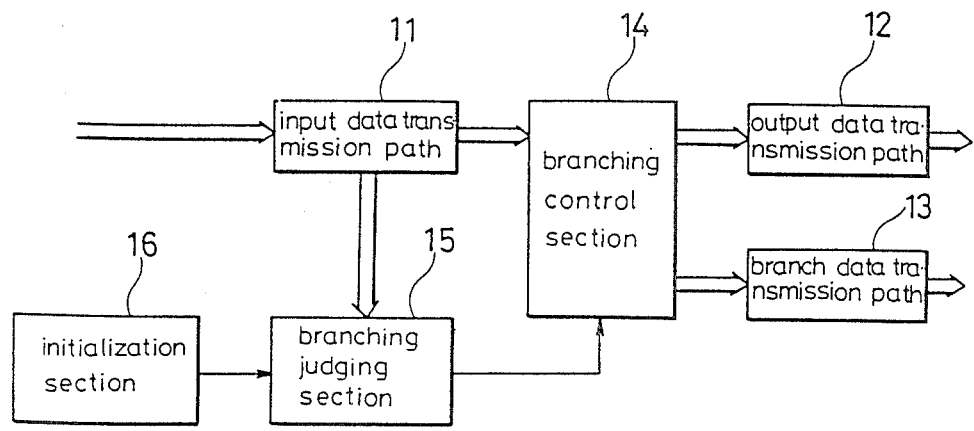
FIG. 3 is a diagram showing the whole construction of a data transmission apparatus as a first embodiment of the present invention.

FIG. 3 shows a construction of a first embodiment of the present invention. The reference numerals 11, 12, and 13 designate an input data transmission path, an output data transmission path, and a branch data transmission path each constituted by a non-synchronous self running shift register. The reference numeral 14 designates a branching control section for transmitting the data on the input data transmission path 11 to the output data transmission path 12 or to the branch data transmission path 13. The numeral 15 designates a branching judging section responsive to the data on the input data transmission path 11 for comparing the branching condition included in the data with a reference branching condition and outputting a branching control signal to the branching control section 14 when both conditions coincide. The reference numeral 16 designates an initialization section for operating the branching judging section 15 at the the start of operation of the device.

Figure 4:
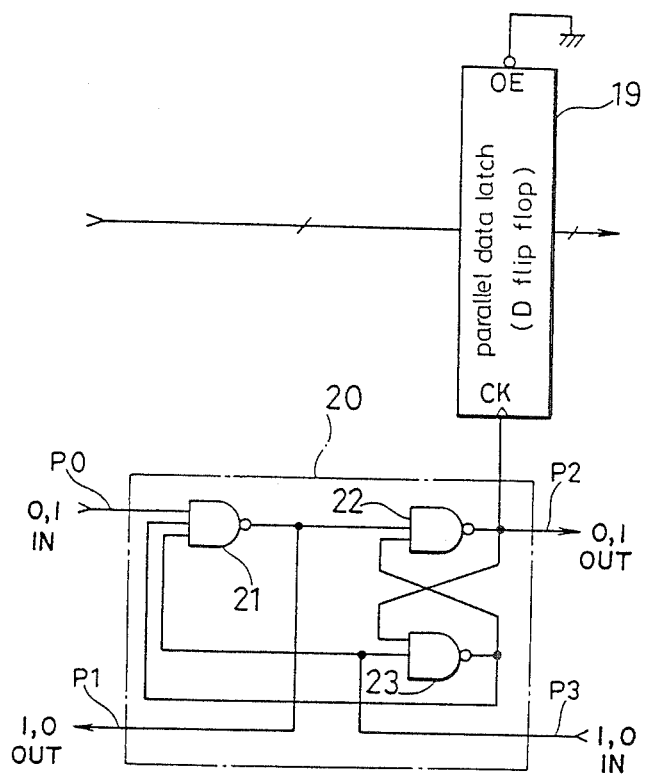
FIGS. 4 and 5 are circuit diagrams showing examples of the non-synchronous self running shift register used in the device of FIG. 3.
Figure 5:
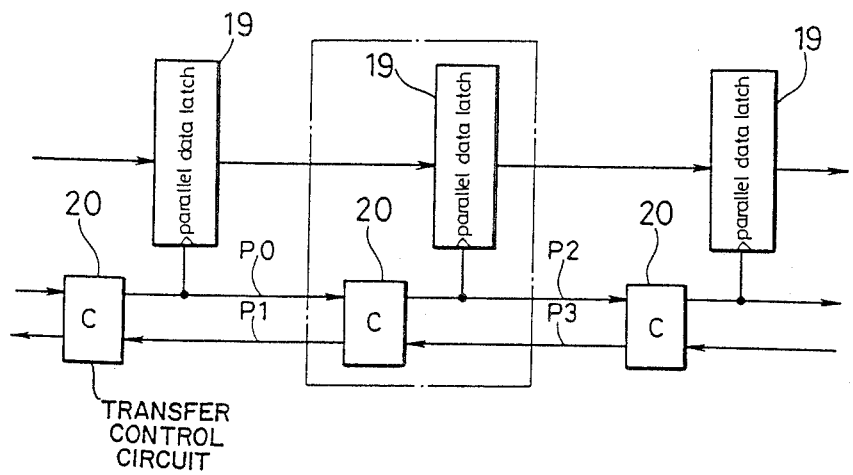

FIGS. 4 and 5 designate an example of a non-synchronous self running shift register used for the input data transmission path 11, the output data transmission path 12, and the branch data transmission path 13. In FIG. 4, reference numeral 19 designates a parallel data latch, numeral 20 designates a transfer control circuit (hereinafter referred to as a "C element") composed by a three input NAND gate 21 and two input NAND gates 22 and 23 for applying a rising edge trigger to the parallel data latch 19. The non-synchronous self running shift register is a register which shifts input data automatically in the output direction without using shift clocks under the condition that the next stage shift register is empty, and it functions to buffer data. This non-synchronous self running shift register is composed of the parallel data buffer 19 and the C element 20, the C element 20 being responsive to two inputs $P_0$ and $P_3$ for outputting two outputs $P_1$ and $P_2$, and the C element 20 has nine internal states $S_0$ to $S_8$ which are determined by the four signals $P_0$ to $P_3$ as shown in the following table.

TABLE 1

| $S_n = ($ | $P0$, | $P1$, | $P2$, | $P3$ $)$ |
|---|---|---|---|---|
| $S_0 = ($ | 0, | 1, | 0, | 1 $)$ |
| $S_1 = ($ | 1, | 1, | 0, | 1 $)$ |
| $S_2 = ($ | 1, | 0, | 0, | 1 $)$ |
| $S_3 = ($ | 1, | 0, | 1, | 1 $)$ |
| $S_4 = ($ | 0, | 0, | 1, | 1 $)$ |
| $S_5 = ($ | 0, | 1, | 1, | 1 $)$ |
| $S_6 = ($ | 0, | 1, | 1, | 0 $)$ |
| $S_7 = ($ | 0, | 1, | 0, | 0 $)$ |
| $S_8 = ($ | 1, | 1, | 0, | 0 $)$ |

In the following description the logical values 0 and 1 denote a low level and a high level of each signal, respectively.

Figure 6:
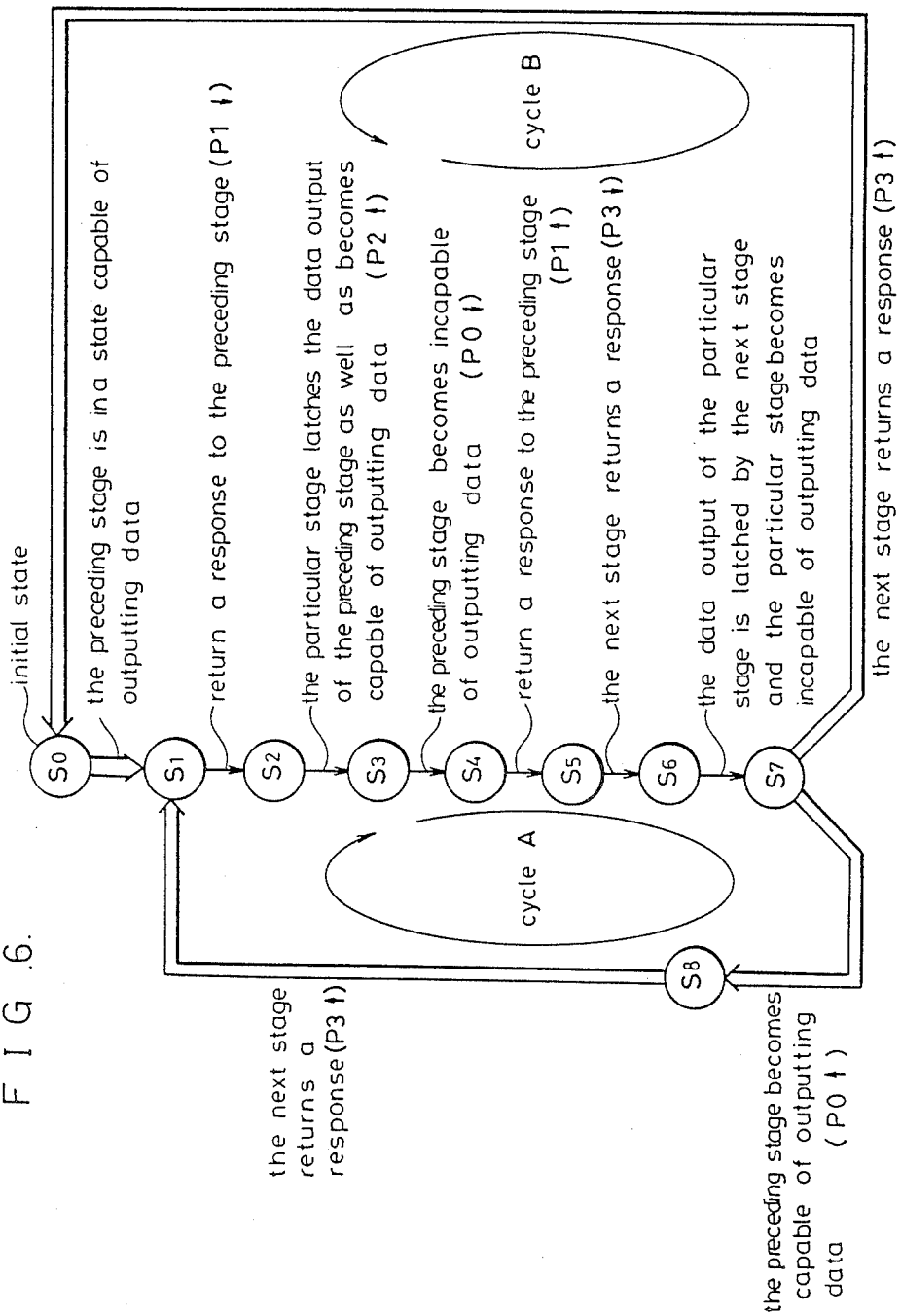
FIG. 6 is a diagram for explaining the function of the non-synchronous self running shift register.

A state transition diagram showing the transition of state between the nine states $S_0$ to $S_8$ of the C element 20 is shown in FIG. 6. In FIG. 6, designates a state transition with a condition, → designates a state transition with no condition, $P_1 \uparrow$, and $P_1 \downarrow$ designate changes of signal values from 0 to 1 and from 1 to 0, respectively. In FIG. 6, whether the state transition proceeds in the cycle A or the cycle B depends on whether the time when the next stage of the shift register can receive data is earlier or later than the timing when the preceding stage is capable of outputting data. Either way, the data at the preceding stage can be transmitted to the next stage by circulating through the cycle A or B.

As shown in FIG. 5, when the C element 20 conducts a state transition as shown in FIG. 6 in a circuit constituted by a plurality of non-synchronous self running shift registers connected with each other, a self-determined independent data transmission is conducted between the parallel data latches 19.

Figure 7:
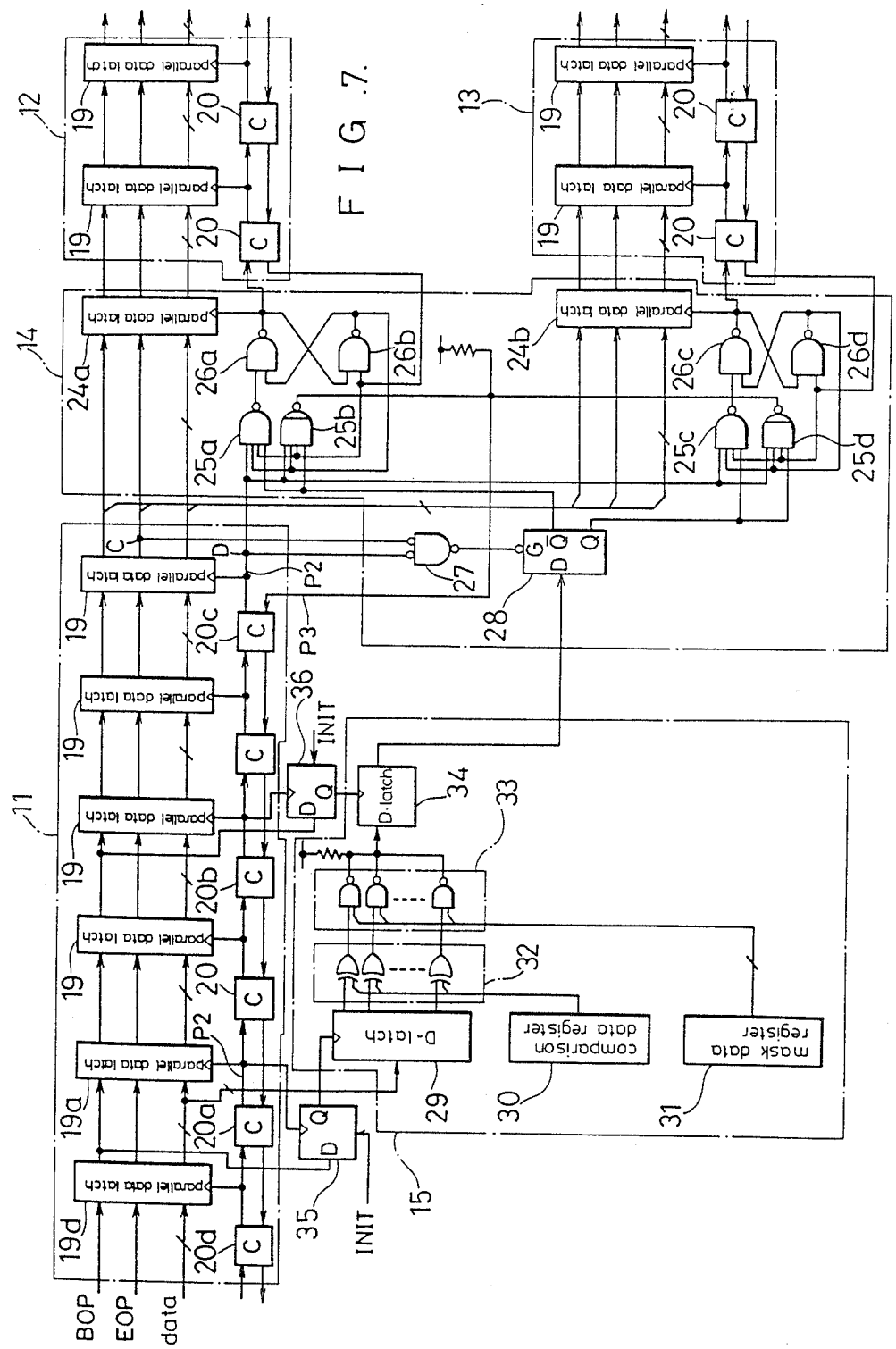
FIG. 7 is a diagram showing a complete circuit construction of the first embodiment.

FIG. 7 shows a circuit construction of this embodiment. The input data transmission path 11, the output data transmission path 12, and the branch data transmission path 13 are constituted by a non-synchronous self running shift register including a parallel data latch 19 and C element 20, and the branching control section 14 is constituted by parallel data latches 24a and 24b, four input NAND gates 25a to 25d, two input NAND gates 26a to 26d, a two input OR gate 27, and a D latch 28. The branching judging section 15 is constituted by a D latch 29, a comparison data register 30, a mask data register 31, an exclusive OR circuit 32, an open collector two input NAND gate 33, and a D latch 34. The initialization section 16 comprises two D type flip-flips 35 and 36 with an initialization function.

The brief operation of this embodiment will be described with reference to FIG. 3. At the start of operation of the device, the initialization of the branching judging section 15 is conducted by a signal from the initialization section 16, and when data is input to the input data transmission path 11, the branching judging means 15 is operated normally in accordance with that data. The branching condition reference data and the condition included in the data on the input data transmission path 11 are compared with each other by the branching judgment section 15, and the branching control section 14 sends the data on the input data transmission path 11 to the branch data transmission path 13 when both conditions coincide, and to the output data transmission path 12 when both conditions do not coincide. Thereafter, the branching judging section 15 conducts a judgment of the branching responsive to the data on the input data transmission path 11.

The operation of the device will be described in greater detail with reference to FIG. 7.

The data has a packet form comprising a plurality of words, each word contains two control bits of BOP and EOP separately from the data section. The BOP of the first word is 1, the EOP of the end word is 1, and the EOP of the first word, the BOP of the end word, and both the BOP and EOP of the other words are 0. The first word contains preceding data information as a branching condition.

When the device is started, a reset signal INIT is given to the D type flip-flops 35 and 36 to initialize (reset) the D type flip-flops 35 and 36. When the first word of the packet is input to the input data transmission path 11 and reaches the stage of the C element 20d, it is latched at the parallel data latch 19d. When the first word input to the input data transmission path 11 reaches the stage of the C element 20a, the $P_2$ output of the C element 20a is changed from 0 to 1, and the first word latched by the parallel data buffer 19d at the preceding stage is latched by the parallel data latch 19a. At the same time the D type flip-flop 35 latches the BOP bit of the first word thereby to output 1, and the D latch 29 latches the first word of the packet similarly as the parallel data latch 19a. This latched first word is compared with the value of the comparison data latch 30 (branching condition) by the exclusive OR circuit 32. Bits which require no comparison among the comparison results are masked by taking a NAND with the value of the mask data register 31, whereby a branching judgment is conducted and the result thereof is output to the D type latch 34. Then, the packet is transmitted on the input data transmission path 11, and when its first word reaches the stage of the C element 20b, the $P_2$ output of the C element 20b is changed from 0 to 1, and the D type flip-flop 36 latches the BOP of the first word thereby to output 1, and the D type latch 34 latches the result of the branching judgment.

On the other hand, when the node C (EOP bit) and the node D ($P_2$ output of the C element 20c) become both 0 after the packet preceding this packet passes through, the D type latch 28 latches the result of the branching judgment from the D type latch 34. When the result is 0, that is when, the branching should not be conducted, the D type latch 28 outputs 0 to the NAND gates 25c and 25d, and 1 to the NAND gates 25a and 25b, whereby the packet is transmitted to the output data transmission path 12 through the parallel data latch 24a. When the result of the branching judgment is 1, that is when, the branching should be conducted, the D type latch 28 outputs 1 to the NAND gates 25c and 25d, and 0 to the NAND gates 25a and 25b, whereby the packet is transmitted to the branch data transmission path 13 through the parallel data latch 24b. There are provided open collector NAND gates 25b and 25d which conduct a similar operation as those of the NAND gates 25a and 25c, the outputs of NAND gates 25b and 25d are negative logic wired ORed, and the resultant signal is connected to the $P_3$ input of the C element 20c, regardless of whether the packet is transmitted to the output data transmission path 12 or the branch data transmission path 13.

In the present embodiment, a D type flip-flop with an initialization function is used for receiving a portion of the BOP signal which is used for the branching judgment at the start of operation, the BOP bit of the data packet being latched by this D type flip-flop, and the packet data of the data transmission path being accepted in accordance with the output of the D type flip-flop, and the branching judgment of the data conducted, whereby the branching judgment is surely conducted even at the start of operation of the device in which the state of the data transmission path is usually unstable.

In the data transmission path of the above-described embodiment, the data transmission path is constituted in a loop configuration, data being branched from this loop transmission path or joined onto this loop transmission path. In such a data transmission path it is possible to initialize all the data remaining on the data transmission path at the start of operation by clearing the data in the loop because the data on the data transmission path is also in the loop transmission path. Thus, it is possible to reset the data transmission path without providing reset circuits over the whole data transmission path.

Figure 9:
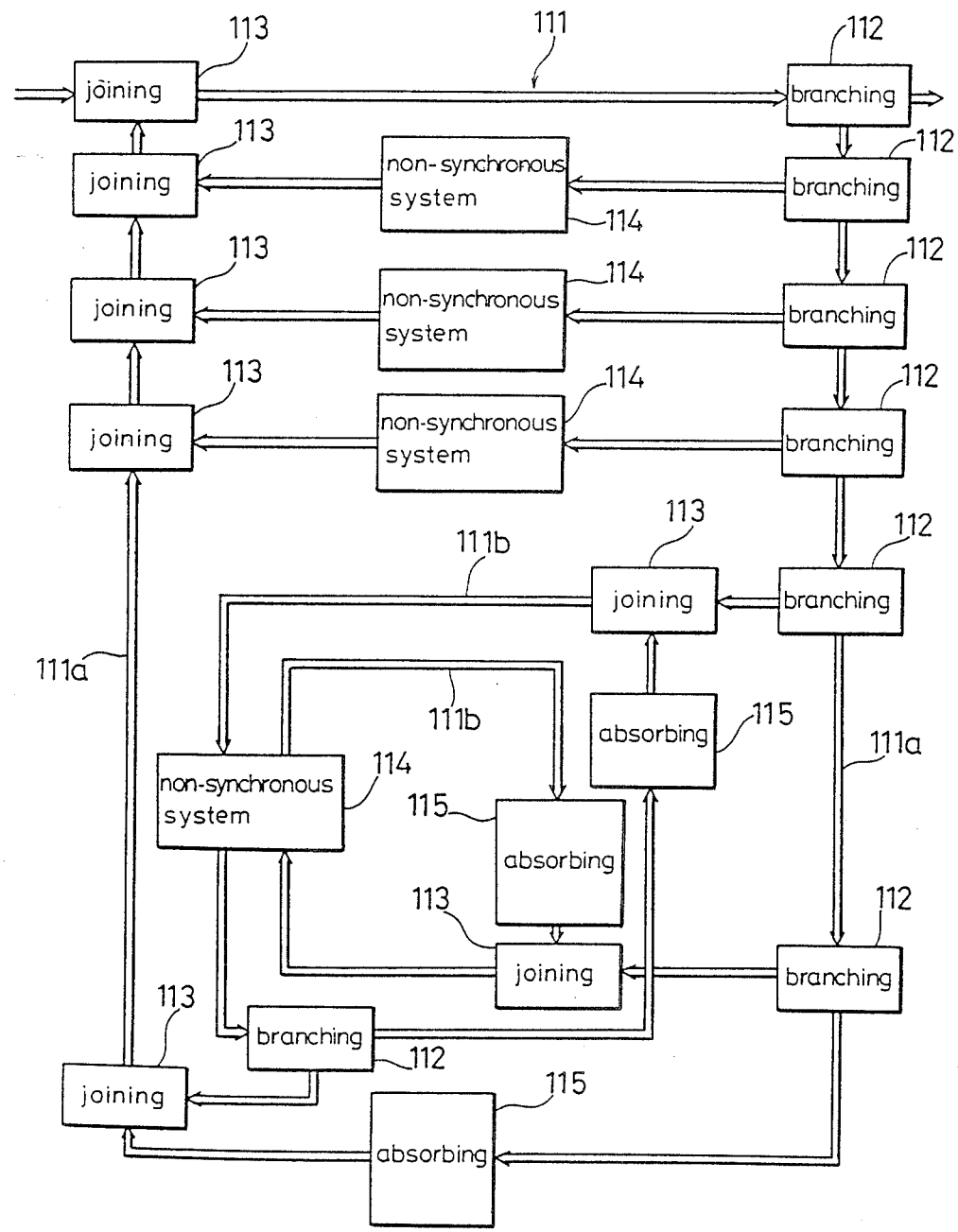
FIG. 9 is a circuit diagram showing the whole construction of a data transmission apparatus as a second embodiment of the present invention.

FIGS. 9 to 12 show a data transmission apparatus of a second embodiment of the present invention. FIG. 9 shows an overall construction of this second embodiment. The reference numeral 111 designates a data transmission path constituted by a non-synchronous self running shift register, which has a main loop transmission path 111a and a branch loop transmission path 111b. The reference numeral 112 designates a branching section for branching the data based upon the result of the comparison of the branching condition data on the data transmission path 111 and a reference branching condition. The reference numeral 113 designates a joining section for joining two data paths upon detection of the empty state of the data transmission path 111 which is to be joined. The numeral 114 designates a non-synchronous system for conducting various processings. The numeral 115 designates an absorption circuit provided in the way of the loop transmission path 111a and 111b for clearing the data on the data transmission path 111 at the start of operation of the device.

Figure 10:
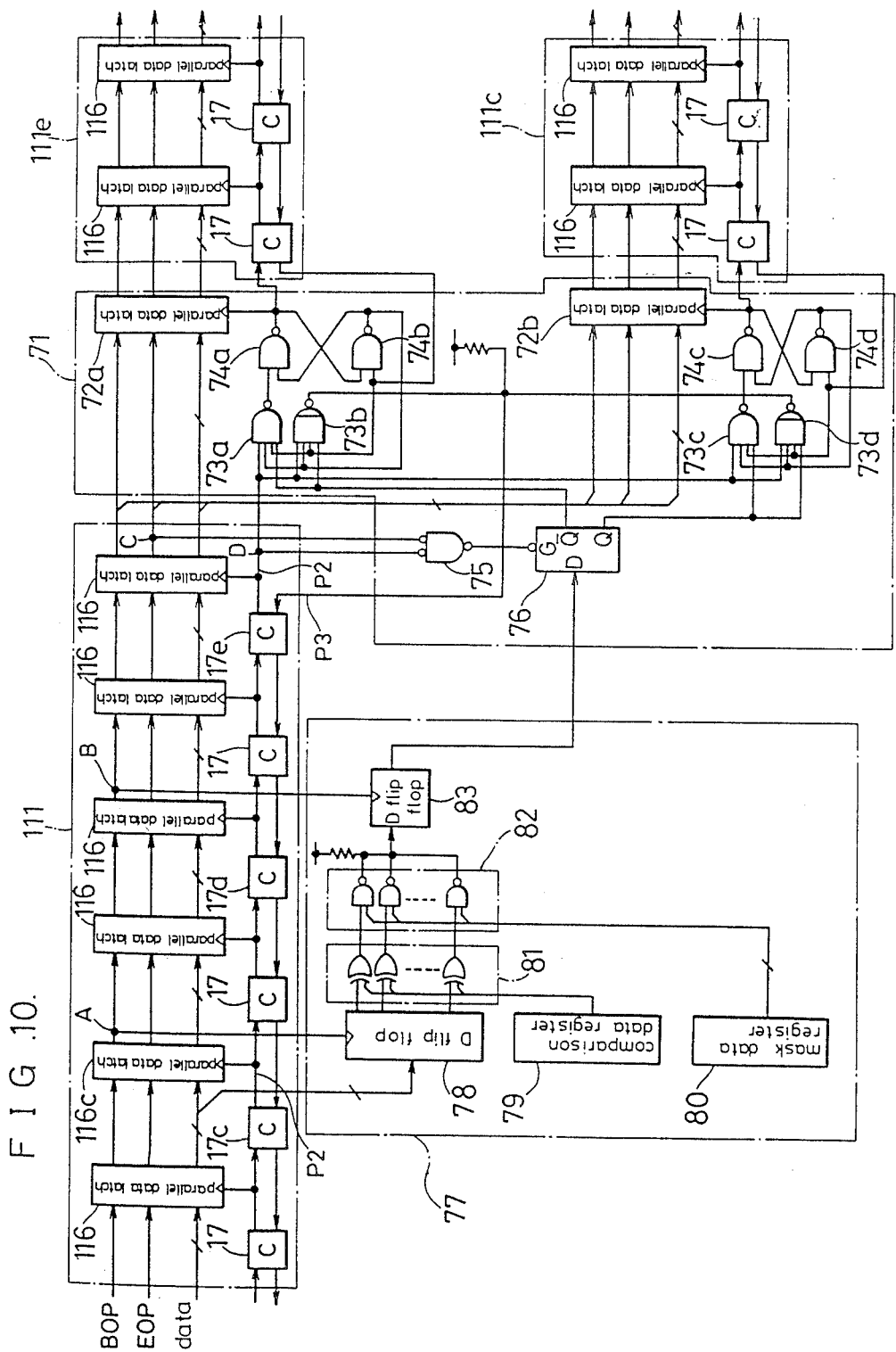
FIGS. 10, 11, and 12 are diagrams showing circuit constructions of the branching section, the joining section, and the absorption circuit of the device of FIG. 9.

FIG. 10 shows an example of the branching section 112. The reference numeral 71 designates a branching control section for controlling to pass the data to the transmission of data transmission path 111 or to the branch data transmission path 111c. This branching control section 71 is constituted by two parallel data latches 72a, 72b, four input NAND gates 73a to 73d, two input NAND gates 74a to 74d, two input OR gate 75, and a D type latch 76. The reference numeral 77 designates a branching judgment section for comparing the condition included in the data on the data transmission path 111 with a reference branching condition and outputting a branching control signal to the branching control section 71 when both conditions coincide. This branching judgment section 77 comprises a D type flip-flop 78, a comparison data register 79, a mask data register 80, an exclusive OR circuit 81, an open collector two input NAND gate circuit 82, and a D type flip-flop 83.

Figure 11:
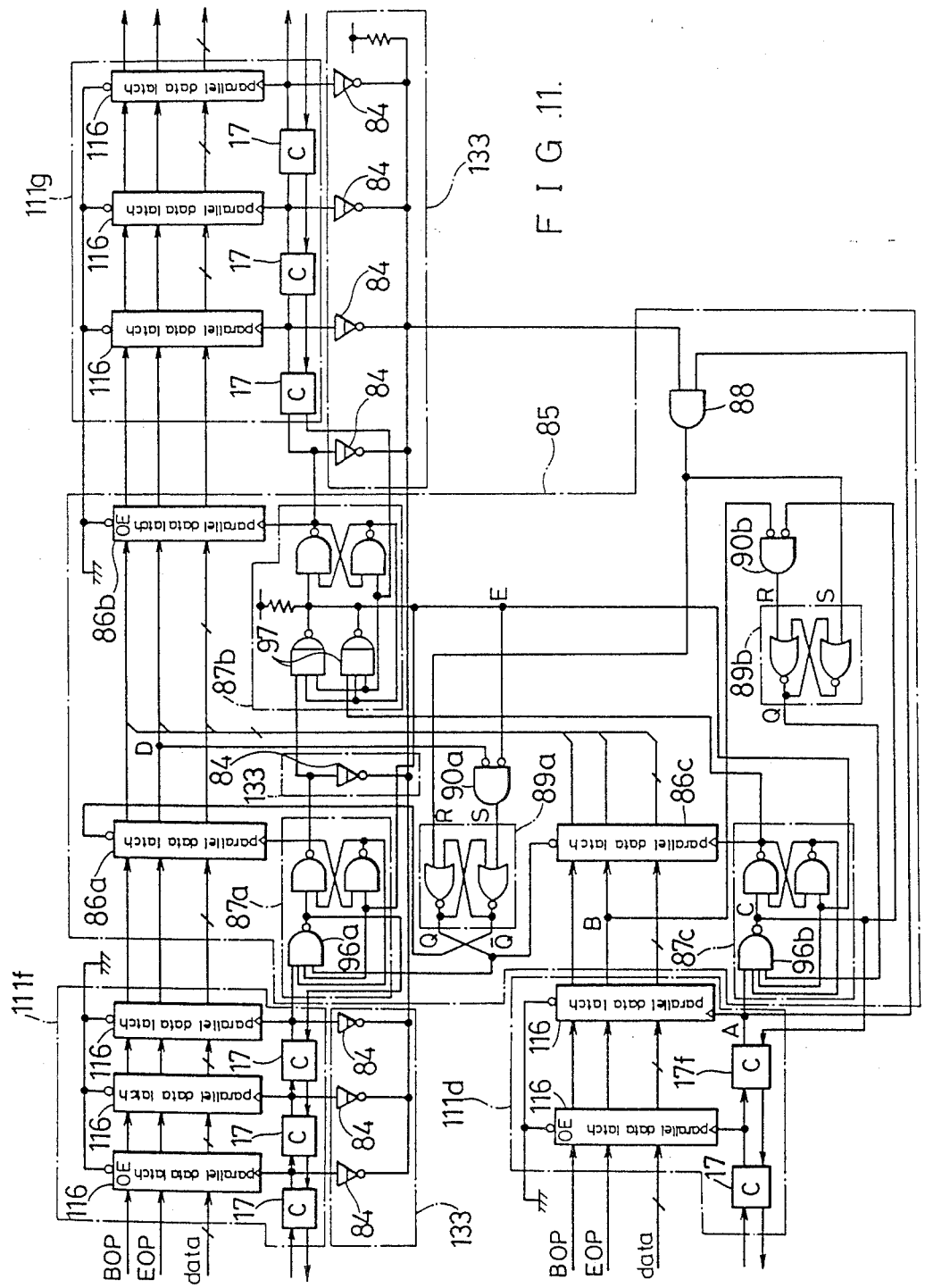

FIG. 11 is an example of the joining section 113. The reference numeral 133 designates an empty buffer supervising section for detecting the existence of an empty buffer on the data transmission path 111 at the preceding or next stage of the joining section 113. This empty buffer supervising section 133 is constituted by an inverter 84. The reference numeral 85 designates a joining control section for transmitting the data of the joining side data transmission path 111d to the data transmission path 111. This joining control section 85 is constituted by parallel data latches 86a to 86c, C elements 87a to 87c, a two input AND gate 88, SR flip-flops 89a and 89b, and two input NOR gates 90a and 90b.

Figure 12:
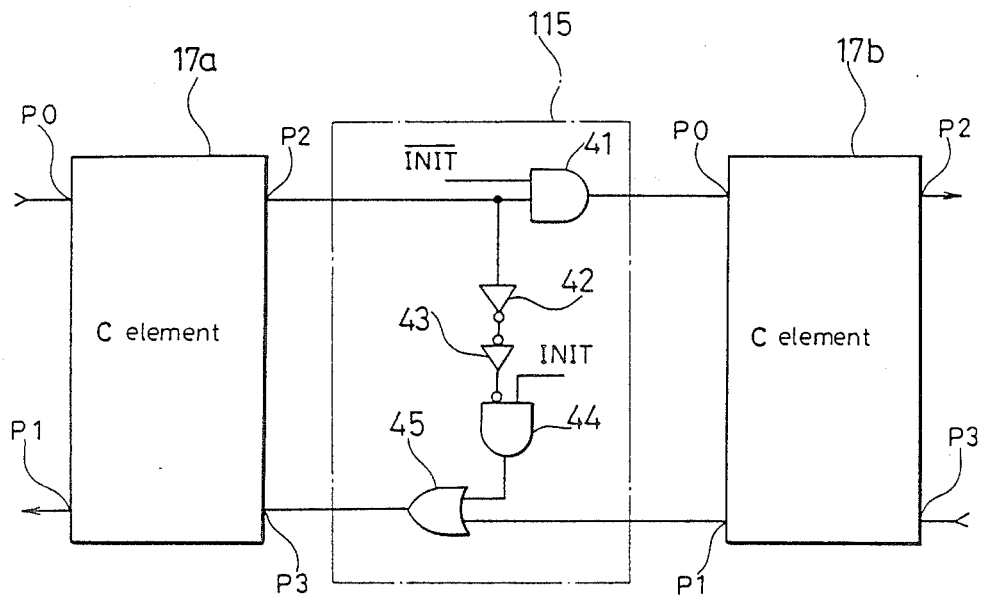

FIG. 12 shows an example of the absorption circuit 115. In FIG. 12, the reference numeral 41 designates an AND gate receiving inputs of a $P_2$ output of the C element 117a and the inverted signal of the reset signal INIT. The reference numerals 42 and 43 designate inverters. The reference numeral 44 designates an AND gate receiving inputs of the inverted signal of the output of the inverter 43 and the reset signal INIT. The reference numeral 45 designates an OR gate receiving inputs of the output of the AND gate 44 and the $P_1$ output of the C element 17b.

A brief operation of the device of FIG. 9 will be described below. When the device is initially started, the absorption circuit 115 is operated to clear the data on the loop transmission paths 111a and 111b, and when the clearing of the data is completed the operation of the absorption circuit 115 is stopped. Thereafter, when data is input to the main loop transmission path 111a, this data circulates the main loop transmission path 111a, the branching condition included in the data and the reference branching condition are compared with each other at each branching section 112, and when the conditions coincide the data is branched to be sent to the non-synchronous system 114. A predetermined processing is executed on the data in the non-synchronous system 14, and this processed data is joined with the data on the main loop transmission path 111a or with the data at the input side section of the branch loop transmission path 111b when an empty buffer is detected at the joining section 113. When the processed data is judged to be data to be branched at the branching section while the data is circulating the branch loop transmission path 111b, it is joined with the data on the main loop transmission path 111a.

Next, the operation of the device will be described in greater detail.

First of all, the operation of clearing the data is described. When the AND gate 41 is closed and the AND gate 44 is opened by applying a reset signal INIT to the absorption circuit 115 and data remains on the transmission path 111 at the start of operation of the device, this data is transmitted on the data transmission path 111. When the data reaches the stage of the C element 17a, the $P_2$ output of the C element 17a is not transmitted to the C element 17b of the next stage, but is delayed by the inverters 42 and 43 and the AND gate 44, and thereafter it is returned to the $P_3$ input of the C element 17a through the OR gate 45. Thus, the data remaining on the data transmission path 111 is erased by forfeiting the data transfer pulses, and the data transmission path 111 is initialized. Thereafter, the input of the reset signal INIT is stopped thereby to open and close the AND gates 41 and 44, respectively, and the data transmission path 111 conducts a usual data transmission.

The operations of the branching section 112 and the joining section 113 will now be described in detail.

Supposing that the data has a packet form comprising a plurality of words, and each word has two control bits of BOP designating the first word and EOP designating the end word, and the first word has preceding information data as a branching condition.

Referring to FIG. 10, when the first word of the packet is input to the data transmission path 111 and reaches the stage of the C element 17c, the $P_2$ output of the C element 17c is changed from 0 to 1, and the value of the data of the first word stored in the parallel data latch 116 of the preceding stage is stored at the parallel data latch 116c. Then the node A (BOP bit) is changed from 0 to 1, and the data of the first word of the packet is latched at the D type flip-flop 78 similarly as latched at the parallel data latch 116c. This latched first word is compared with the value of the comparison data register 79 by the exclusive OR circuit 81. The bits of the outputs of the exclusive OR circuit 81 requiring no comparison are masked by the NAND gate circuit 82, and the result of the branching judgment is output to the D type flip-flop 83. In the meantime, the packet is transmitted on the data transmission path 111, and when its first word reaches the stage of the C element 17d, the node B (BOP bit) is changed from 0 to 1, whereby the branching judgment result is latched by the D type flip-flop 83, and this result is output to the D type latch 76.

A signal output from the D type flip-flop 83 is latched at the D type latch 76 when the node C (EOP bit) and the node D ($P_2$ output of the C element 17e) become 0 after the passage of a packet preceding that packet, and the inputs of the four input NAND gates 73a to 73d are controlled by the outputs of the D type latch 76. In detail, when the branching condition is 0, 0 is input to the NAND gates 73c and 73d and 1 is input to the NAND gates 73a and 73b so as to prevent branching, whereby the packet is controlled to be transmitted to the data transmission path 111e. On the contrary, when the branching condition is 1, signals opposite to those described above are input to the NAND gates 73a to 73d, and the packet is transmitted to the branch data transmission path 111c. Then, in order to return a response to the $P_3$ input of the C element 17e regardless of whether the packet is transmitted to the branch or element transmission paths, there are provided open collector NAND gates 73b and 73d which operate similarly to the NAND gates 73a and 73c, and the negative logic wired ORed outputs of these NAND gates 73b and 73d are sent to the P3 input of the C element 17e.

Next, the operation of the joining section 113 shown in FIG. 11 will be described below. The data on the joining data transmission path 111d is intended to be joined to the main trunk data transmission path 111, the joining is allowed only when an empty buffer exists on the trunk because the data flowing on the trunk has priority over the data to be joined. In detail, when data does not exist on the trunk the negative logic wired ORed output of the open collector inverters 84 becomes 1, and when the node A which is the P2 output of the C element 17f becomes 1 by the data arriving at the joining data transmission path 111d, both inputs of the two input AND gate 88 become 1, thereby making the output thereof 1, the SR flip-flop 89b is set and the SR flip-flop 89a is reset. Thus, with respect to the joining data transmission path 111d a signal output from the SR flip-flop 89b which is input to the four input NAND gate 96b becomes 1 and the C element 87c conducts the same operation as those of the other C elements. At the same time, the parallel data buffer 86c becomes capable of outputting data, and the data on the joining data transmission path 111d joins with the data on the trunk. On the other hand, with respect to the data transmission path 111f a signal output from the SR flip-flop 89a which is input to the four input NAND gate 96a becomes 0 and the C element 87a does not transmit the data of the preceding stage. Besides, the output of the parallel data latch 86a has a high impedance state, and the joining is conducted smoothly even if the data reaches the data transmission path 111f in the midst of the joining operation.

When the joining of the data of one packet is completed, the data on the trunk is controlled to flow again. In detail, when the C element 17f sends the end word of the packet the node B (EOP bit) becomes 0, and when the C element 87c receives this the node C becomes 0. Accordingly, the two input NOR gate 90b receives the signals of the nodes B and C and outputs 1, the SR flip-flop 89b is reset, and the transmission of the next packet which is to be conducted between the C elements 17f and 87c is stopped. Furthermore, when the end word of the joined packet is received by the first stage of the data transmission path 111g, that is, the node D (EOP bit) and the node E become both 0, the input signals of the two input NOR gate 90a become 0, the SR flip-flop 89a is set, and the C element 87a transmits the data at the preceding stage, thereby resuming the flow of data on the trunk.

An open collector NAND gate 97 is provided so as to return a response to the P3 inputs of the C elements 87a and 87c from the C element 87b while the packet is transmitted as described above, and the outputs of the NAND gates 97 are negative logic wired ORed to be sent to the P3 inputs of the C element 87a and 87c.

In the embodiment described above the clearing of the data is conducted in a loop transmission path, thereby enabling initialization by clearing the data remaining on the data transmission path, with no increase in circuit size from the case where the initialization is conducted by resetting all of the non-synchronous self running shift registers.

In the above-illustrated embodiment two stages of inverters are provided in the absorption circuit, but this absorption circuit may have more stages of inverters in the case that there are an odd number of stages including the AND gate.

Figure 13:
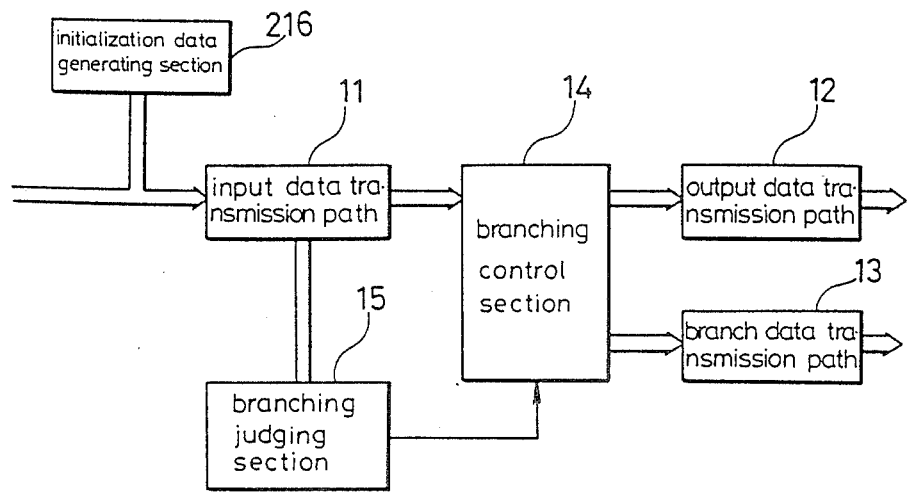
FIG. 13 is a circuit diagram showing the whole construction of a data transmission apparatus as a third embodiment of the present invention.

FIG. 13 shows an overall construction of a data transmission path as a third embodiment of the present invention. The reference numerals 11, 12, and 13 designate an input data transmission path, an output data transmission path, and a branch data transmission path, respectively, each constituted by a non-synchronous self running shift register. The numeral 14 designates a branching control section for transmitting the data on the input data transmission path 11 to the output data transmission path 12 or to the branch data transmission path 13. The reference numeral 15 designates a branching judging section responsive to the data on the input data transmission path 11 for comparing the branching condition included in the data on the input data transmission path 11 with a reference branching condition and outputting a branching control signal to the branching control section 14 when both conditions coincide. The reference numeral 216 designates an initialization data generating section for transmitting data for initializing the input data transmission path 11 at the start of operation of the device.

The device operates as follows.

When the device is started, an initialization data is input to the input data transmission path 11 from the initialization data generating section 216, whereby the input data transmission path 11 is initialized. The operation thereafter is the same as the branching operation of the second embodiment. That is, when data is input to this input data transmission path 11 in this state, the branching judging section 15 compares the condition included in the data on the input data transmission path 11 with the reference branching condition. This branching judging section 15 sends the data on the input data transmission path 11 to the branch data transmission path 13 when both conditions coincide and sends the data on the data transmission path 11 to the output data transmission path 12 when both conditions do not coincide.

In this embodiment, the input data transmission path is initialized by transmitting a particular data on the input data transmission path at the start of operation, whereby the branching judgment and the branching of the data are assuredly conducted at the start of operation.

Figure 14:
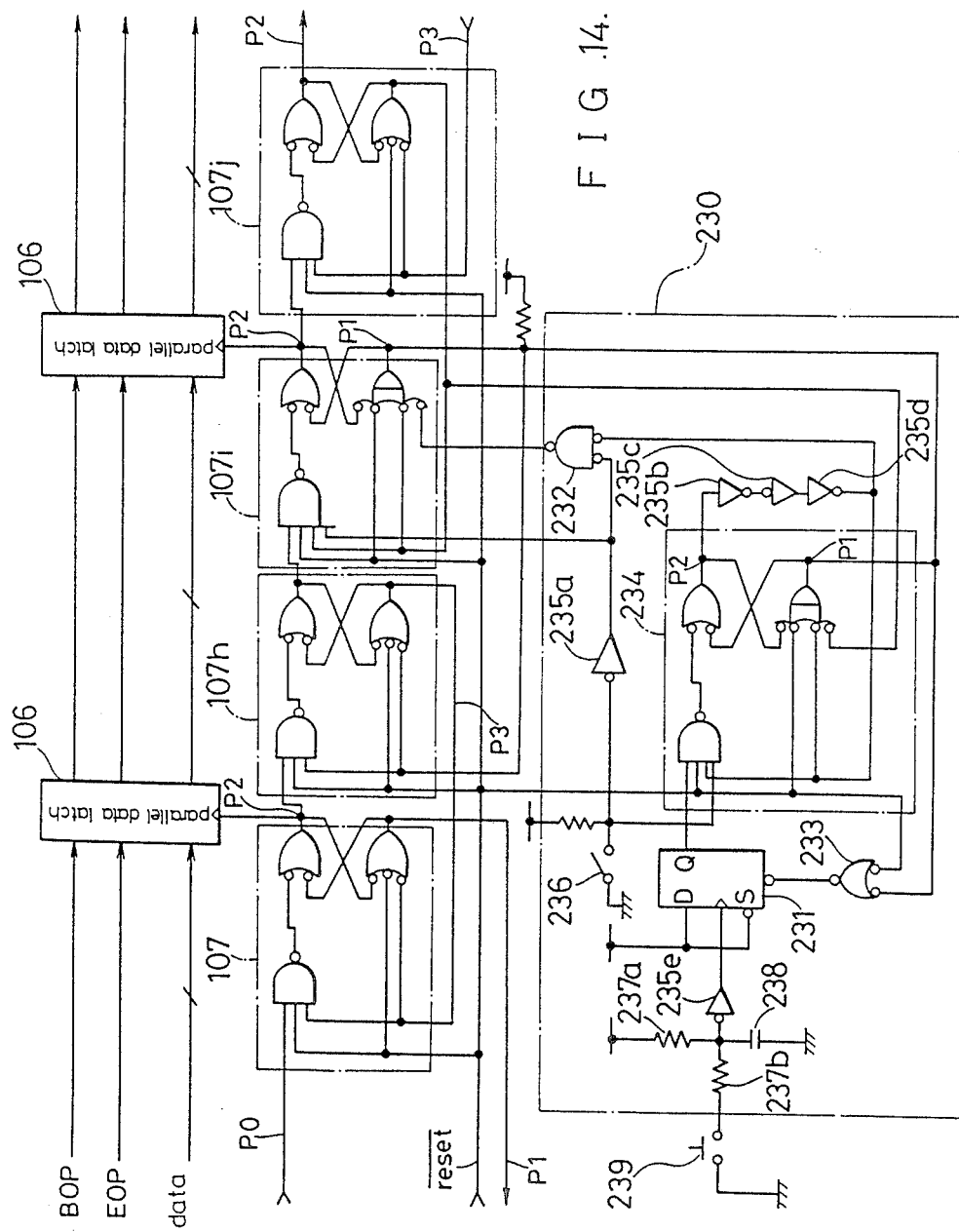
FIG. 14 is a circuit diagram showing the whole construction of a data transmission apparatus as a fourth embodiment of the present invention.

FIG. 14 shows a data transmission apparatus of a fourth embodiment of the present invention. In FIG. 14, the reference numeral 230 designates a transmission timing control means which is constituted by a D type flip-flop 231, a negative logic AND gate 232, a negative logic OR gate 233, a C element 234, inverters 235a to 235e, a toggle switch 236, resistors 237a and 237b, and a capacitor 238. The reference numeral 239 designates a momentary switch for initiating the transfer timing of the data. In this embodiment there are provided C elements of two stage construction, and the two C elements 107i and 234 are constituted by using an open collector type four input NAND gate, respectively.

The device operates as follows.

When the toggle switch 236 is turned ON, the transmission path conducts a usual operation. When the toggle switch 236 is turned OFF, the output of the inverter 235a becomes 0, and the data transmitted on the transmission path reaches the stage of the C element 107h, and it is stopped there for a while. When the momentary switch 239 which is a normal OFF type is closed the clock input to the D type flip-flop 231 becomes 1, and the Q output thereof becomes 1. Thus, the $P_2$ output of the C element 234 becomes 1, and the $P_1$ output which is an inverted signal of the $P_2$ output becomes 0. This $P_2$ output passes through the inverters 235b, 235c, and 235d, and the output of the inverter 235d becomes 0. Thus the $P_2$ output of the C element 234 again becomes 0, and the $P_1$ output which is an inverted output becomes 1. The $P_1$ output of this C element 234 becomes 1 after it becomes 0 for a while, therefore the $P_2$ output of the C element 107i becomes 0 after it becomes 1 for a while, and the C element 107i outputs a $P_1$ output indicating that it has received that signal to the preceding stage C element 107h, and sends the $P_2$ output to the next stage C element 107j so as to transmit one word data to the next stage. Thus the data can be transmitted word by word by operating the momentary switch 239.

In this embodiment, the output timing of the $P_2$ and $P_1$ outputs of the C element is controlled by the transfer timing control circuit 230, and the data is transmitted word by word. Accordingly, it is possible to constitute an operation processing unit by using the device of this embodiment in which various states of various function elements can be separately observed.

In the illustrated embodiment, a C element of two stage construction is used, but this may be constituted in one stage as shown in FIG. 4.

Figure 16:
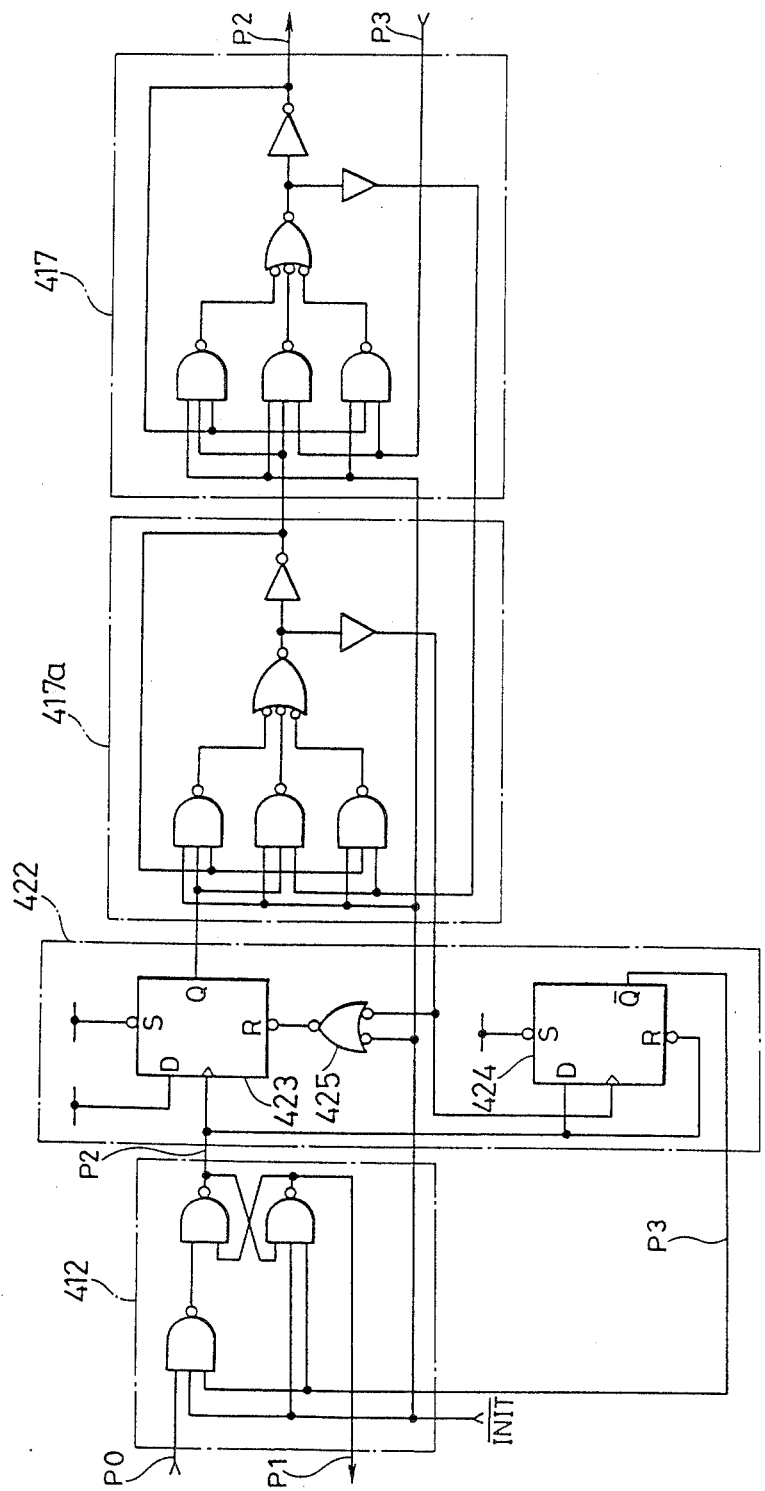
FIG. 16 is a circuit diagram showing the whole construction of a data transmission apparatus as a fifth embodiment of the present invention.

FIG. 16 shows a fifth embodiment of the present invention In FIG. 16, the reference numeral 422 designates an interface provided between first and third C element 412 and 417. This interface 422 is constituted by two flip-flops 423 and 424 and a negative logic OR gate 425.

The device operates as follows.

Suppose that the C elements 412, 417a, and 417 and flip-flops 423 and 424 are previously reset. When the data input to the data transmission path reaches the stage of the C element 412, the $P_2$ output of the C element 412 becomes 1 from 0 and is input to the clock input of the flip-flop 423. Thus, the Q output of the flip-flop 423 becomes 1, and is sent to the next stage C element 417a at its $P_0$ input, and the data is latched at the stage of the C element 417a. Since the $P_2$ output and the $P_1$ output of the C element 417a become 1 and 0, respectively, the flip-flop 423 is reset and its Q output becomes 0. Since the $P_2$ output of the C element 417a which is input to the $P_0$ input of the C element 417 becomes 1, the $P_2$ output and the $P_1$ output of the C element 417 become 1 and 0, respectively. Since the $P_1$ output of this C element 417 which is input to the $P_3$ input of the C element 417a becomes 0, the $P_1$ output of the C element 417a becomes 1. Since the $P_1$ output of the C element 417a becomes 1, the flip-flop 424 latches the $P_2$ output of the C element 412 (which is still 1), and the $\overline{Q}$ output thereof becomes 0. Since the $\overline{Q}$ output of the flip-flop 424 is input to the $P_3$ input of the C element 412, the $P_2$ and the $P_1$ outputs of the C element 412 become 0 and 1, respectively. Since the $P_2$ of the C element 412 becomes 0, the flip-flop 424 is reset and the $\overline{Q}$ output thereof becomes 1.

In this embodiment, an interface comprising flip-flops is provided between a speed dependent first type C element and a speed independent third type C element, whereby control signals of the first and the third type C element are sent to the third and the first type C element, respectively, at predetermined times. Such a construction assures an accurate data transmission.

Figure 17:
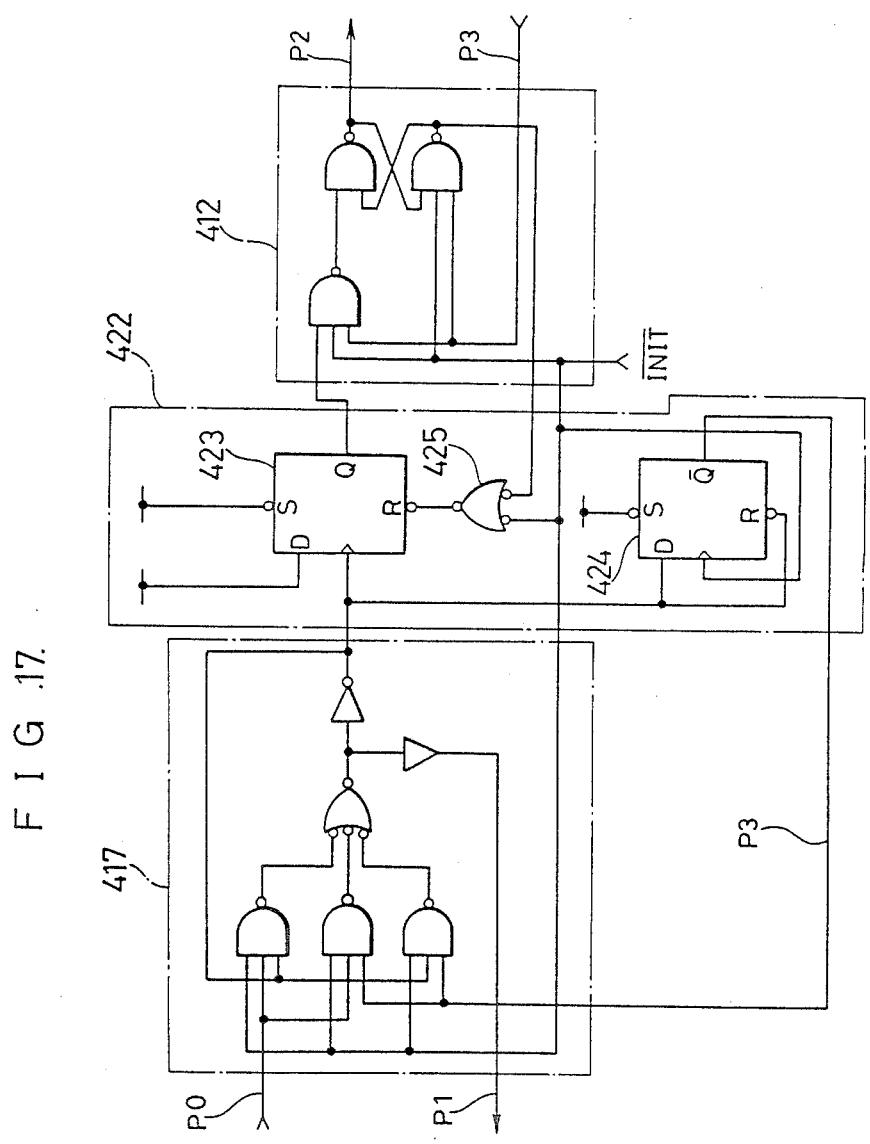
FIG. 17 is a circuit diagram showing the whole construction of a modification of the fifth embodiment.

FIG. 17 shows a sixth embodiment of the present invention, wherein an interface 422 is provided between a preceding stage third type C element 417 and a succeeding stage first type C element 412.

In the above-illustrated embodiment the first type C element and the third type C element are connected to each other, but the present invention is also applicable to a case where a first type C element and a second type C element are connected to each other, or a second type C element and a third type C element are connected to each other. The present invention is also applicable to a case where more than two first or second type C elements having different operational speeds are connected to each other.

In the above-illustrated five embodiments data transmission is conducted between non-synchronous systems, but the present invention is also applicable to a case where data transmission is conducted between synchronous systems, and in this case the C element may be a synchronous type control circuit.

In the illustrated first to fourth embodiments the C element used in the non-synchronous self running shift register may be one having a different construction from that of the first type C element 20 shown in FIG. 4, for example, a second type C element 50 shown in FIG. 8(a), or a third type C element 51 shown in FIG. 8(b). In FIG. 8(a) the second type C element 50 is constituted by a two stage construction of the first type C elements 20, and in FIG. 8(b) the third type C element 51 is constituted by three two input NAND gates 52a, 52b, and 52c, a negative logic three input OR gate 53, and an inverter 54.

The fifth embodiment is an example in a case where different kinds of C elements are used as described above.

As is evident from the foregoing description, according to the present invention, a branching judging means responsive to the data on the data transmission path for judging whether the branching should be conducted or not is provided to be operated by the initialization means at the start of operation of the device, whereby the branching of the data is surely conducted.

Furthermore in the second embodiment, a clearing of data is conducted in each loop transmission path in a data transmission apparatus including at least a loop transmission path, whereby an intialization of the data transmission path can be conducted with no increase in the circuit size.

In the third embodiment, the initialization of the data transmission path is conducted by sending a particular data through the data transmission path at the start of operation, whereby the branching of the data is assured.

In the fourth embodiment, the output timing of the control signals of at least a C element is controlled in accordance with an instruction of the data transfer timing from a transfer timing control means, whereby the data can be transmitted slowly if required.

Furthermore in the fifth embodiment, an interface is provided between adjacent two C elements at least one of which is of a speed dependent type for giving control signals for the preceding stage or next stage C element to t next stage or the preceding stage C element at predetermined timings, whereby an accurate and stable data transmission is secured.

What is claimed is:

1. A data transmission apparatus for transferring data between non-synchronous systems, comprising:

an input data transmission path, an output data transmission path, and a branch data transmission path, each data transmission path being composed of a shift register having a plurality of data storage stages and a plurality of data transfer control circuits each corresponding to a said data storage stage and controlling said corresponding data storage stage in accordance with control signals from transfer control circuits of adjacent stages indicating whether data is present at said adjacent stages;

branching control means for determining whether data on said input data transmission path is to be sent to said output data transmission path or said branch data transmission path and transmitting the data on said input path to said output path or said branch path in accordance with the result of the determination; and initialization means for initializing the apparatus upon commencement of operation by eliminating data remaining on any transmission path from a previous operation.

2. The data transmission apparatus of claim 1, wherein said initialization means comprises means for transmitting data for initializing said input data transmission path to said input data transmission path at the start of operation.

3. The data transmission apparatus of claim 1, wherein said input data transmission path, said output data transmission path, and said branch data transmission path are in a loop configuration, and said initialization means comprises an absorption circuit provided on said loop for eliminating the data on the loop at the time when the apparatus is initialized.

4. The data transmission apparatus of claim 1, wherein each said data storage stage comprises a data latch.

5. A data transmission apparatus, comprising:

a data transmission path composed of a non-synchronous self running shift register having a plurality of data storage stages and a plurality of data transfer control circuits each corresponding to a said data storage stage and controlling said corresponding data storage stage to transfer data to a succeeding stage in accordance with control signals from transfer control circuits of preceding and succeeding adjacent stages which indicate whether data is present at said adjacent stages and independent of any external clock signal;

initiating means for initiating timing of data transfer and clearing any data existing on said data transmission path at the start of operation of said apparatus; and transfer control means responsive to said initiating means for controlling the timing of the control signals of at least one data transfer control circuit in accordance with the timing of data transfer.

6. The data transmission apparatus of claim 5, wherein each said data storage stage is a data latch.

7. A data transmission apparatus for transmitting data between systems comprising:

a data transmission path composed of a non-synchronous self running shift register having a plurality of data storage stages and a plurality of data transfer control circuits each corresponding to a said data storage stage to transfer data to a succeeding stage and controlling said corresponding data storage stage in accordance with control signals from transfer control circuits of preceding and succeeding adjacent stages which indicate whether data is present at said adjacent stages and independent of any external clock signal; and an interface provided between two adjacent transfer control circuits one of which is of a speed dependent type and the other of which is of a speed independent type, wherein a control signal input operates the interface to change the output in response to the control signal input, which interface transmits control signals between the transfer control circuits at predetermined times;

initiating means for initiating timing of data transfer and clearing any data existing on said data transmission path at the start of operation of said apparatus; and transfer control means responsive to said initiating means for controlling the timing of the control signals of at least one data transfer control circuit in accordance with the timing of data transfer.

8. The data transmission apparatus of claim 7, wherein each said data storage stage is a data latch.

9. The apparatus as defined by claim 7 wherein said control signal input comprises a clock signal.

* * * * *